G. W. GRAVES.
CORN-MARKER.

No. 184,369.  Patented Nov. 14, 1876.

WITNESSES:
Francis McArdle
John Goethals

INVENTOR:
G. W. Graves
BY Munn & Co
ATTORNEYS.

UNITED STATES PATENT OFFICE.

GEORGE W. GRAVES, OF VILLISCA, IOWA, ASSIGNOR TO HIMSELF AND AMOS P. WEST, OF SAME PLACE.

IMPROVEMENT IN CORN-MARKERS.

Specification forming part of Letters Patent No. 184,369, dated November 14, 1876; application filed September 16, 1876.

*To all whom it may concern:*

Figure 1:
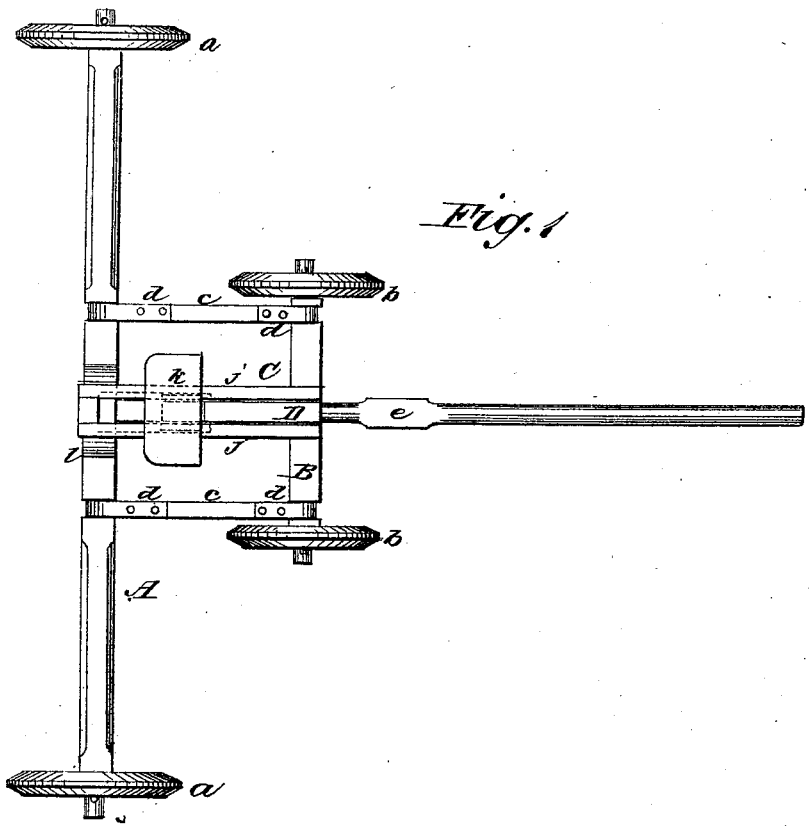
Figure 2:
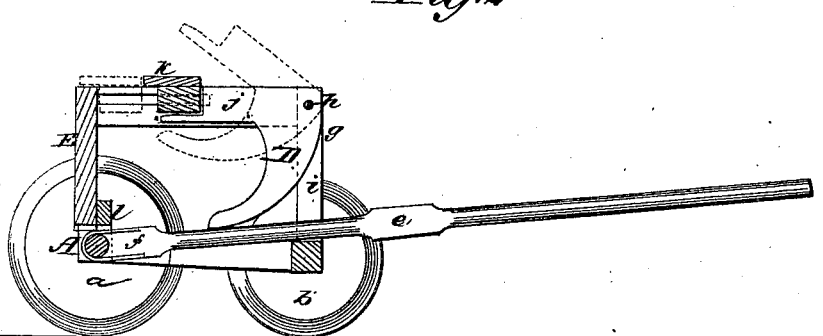

Be it known that I, GEORGE W. GRAVES, of Villisca, county of Montgomery, and State of Iowa, have invented a new and Improved Corn-Marker, of which the following is a specification:

In the accompanying drawing, Figure 1 is a top view, and Fig. 2 a side elevation, in section, of my improved corn-marker.

Similar letters of reference indicate corresponding parts.

My invention consists in two sets of beveled wheels, arranged on two axles, the rear and longer one being capable of embracing four rows, and connected to a short one in front by bars, in such a way that the front axle is capable of moving vertically independently of the rear one. It also consists in the peculiar manner of attaching and locking the tongue.

In the drawing, A is the long axle, which is placed at the rear of the machine, and upon which are placed the wheels $a$, which are beveled from each side toward the center of the tread to render them more efficient in marking. B is an axle, having a length equal to one-third that of the axle A, upon which are placed the bevel-wheels $b$, which are similar to the wheels $a$. The axle B is rounded near each end to receive the connecting-bars $c$, which are also fitted to the axle A. $d\,d$ are straps that surround the axles, and are attached to the connecting-bars $c$. The tongue $e$ is attached to the center of the axle A by a strap, $f$. D is a locking-lever, which is pivoted at $h$ in a frame, $g$, consisting of two vertical pieces attached to the axle B, and two horizontal pieces, $j$, attached to the upper ends of the pieces $i$, and grooved to receive the sliding seat $k$. E is a standard, bolted to the pieces $j$, and pivoted at its lower end in a gain in the block $l$, attached to the center of the axle A. The said gain is beveled to admit of a certain amount of motion in the standard E. The lower arm of the locking-lever D is curved backward, forming a cam, by which the tongue is forced down and locked. The upper arm of the lever is notched, so that when it is down the seat may be slipped over it to retain it.

The wheels $a$ and $b$ are so arranged that they make four equally-distant marks as they pass over the field. When the tongue is not locked by the lever the wheels $b$ are free to follow the inequalities of the ground.

Having thus described my invention, what I claim as new, and desire to secure by Letters Patent, is—

The frame $g$, locking-lever D, sliding seat $k$, pivoted standard E, axles A B, wheels $a$ $b$, and tongue $e$, substantially as herein shown and described.

GEO. W. GRAVES.

Witnesses:
 P. R. BATES,
 J. M. HOWLAND.